United States Patent
Kodama et al.

(10) Patent No.: US 6,187,218 B1
(45) Date of Patent: Feb. 13, 2001

(54) METHOD OF PRODUCING NI-CU-ZN FERRITE MATERIAL

(75) Inventors: Takashi Kodama, Otsu; Hideo Ajichi, Omihachiman; Takehiro Konoike, Shiga-ken; Kunisaburo Tomono, Otsu, all of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/408,053

(22) Filed: Sep. 29, 1999

(30) Foreign Application Priority Data

Oct. 19, 1908 (JP) .................................................. 10-280155
Oct. 1, 1998 (JP) .................................................. 10-280154

(51) Int. Cl.⁷ ............................. C04B 35/26; H01F 1/10
(52) U.S. Cl. ....................................... 252/62.6; 252/62.62
(58) Field of Search ................................. 252/62.6, 62.62

(56) References Cited

U.S. PATENT DOCUMENTS 3,509,057 * 4/1970 Gregor .............................. 252/62.62

FOREIGN PATENT DOCUMENTS 10-256023 * 9/1998 (JP) .

* cited by examiner

*Primary Examiner*—C. Melissa Koslow
(74) *Attorney, Agent, or Firm*—Ostrolenk, Faber, Gerb & Soffen, LLP

(57) ABSTRACT

A method of producing a Ni—Cu—Zn ferrite material comprises the steps of preparing a mixture of an iron compound powder having a specific surface area of about 8.5 $m^2/g$ or more, a nickel compound powder, copper compound powder and a zinc compound powder, the mixture having a specific surface area of about 8.0 $m^2/g$ or more; pre-calcining the mixture such that the pre-calcined mixture has a surface area of about 5.0 $m^2/g$ or more and a spinel crystal synthesizability within a range of about 80.5% to 98%; and milling the pre-calcined mixture to obtain a powder of a Ni—Cu—Zn ferrite material having a specific surface area of about 6.0 $m^2/g$ or more.

20 Claims, No Drawings

METHOD OF PRODUCING NI-CU-ZN FERRITE MATERIAL

BACKGROUND OF THE INVENTION

1. Field of the Invention

The present invention relates to a method of producing a ferrite material, in particular a Ni—Cu—Zn ferrite material which is suitable for use as a chip inductor.

2. Description of the Related Art

An inductor element has been used as a noise filter in an electric circuit of an electronic device. In order to achieve a compact size and effect a high density attachment, there has been suggested and put into practical use a chip inductor involving only a small amount of a magnetic flux leakage, occupying only a small area, and having a structure in which the inner conductor is disposed within a ferrite ceramic (core).

Such chip inductors, for example, may be obtained by simultaneously calcining a plurality of ferrite material layers and electrically conductive material layers formed between the ferrite layers. In general, there has been used a Ni—Cu—Zn ferrite material as the ferrite material for forming the chip inductors, and, as an electrically conductive material, there has been used a Ag material which has a high electric conductivity.

When Ag is used as an electrically conductive material and the above chip inductor is obtained by means of a simultaneous calcining treatment, the melting point of Ag is 950° C. under the oxygen equilibrium conditions in the atmosphere. If it is heated to a temperature of 900° C. or higher, a plastic deformation of Ag will begin as the time of heating progresses, thereby causing it to penetrate and disperse throughout the ferrite. Because of this, there will occur some problems which can include the cross sectional area of the internal conductor will decrease, the direct current resistance value will increase, and the consumption electric power will thus increase. Moreover, if it is heated to a high temperature which is higher than 950° C., a part of the internal conductor will be disconnected, losing the predetermined function as an inductor. For this reason, it is required that the calcining treatment should be conducted at a temperature of 950° C. or lower, preferably 900° C. or lower, in order to obtain a chip inductor using Ag as an internal conductor.

However, it is necessary to calcine a Ni—Cu—Zn ferrite material which was used as a core material (ferrite ceramic) of a chip inductor at a temperature of 1000° C. or higher so as to obtain a dense calcined body. If the calcining treatment is conducted at a temperature lower than such a value, it is impossible to obtain a sufficient calcining density, hence causing a problem in that the initial magnetic permeability becomes low and pores are adversely created in the calcined body.

Further, in order to effectively remove a noise component having a low frequency of 30 MHz or lower, it is required that, as a characteristic of a noise filter for use in an electric circuit, the cross point frequency at the intersection of an R component frequency curve and the X component frequency curve should be controlled to a value of 10 MHz or lower. For this reason, it is required that the initial magnetic permeability of the Ni—Cu—Zn ferrite material, which is used as a core material of a chip inductor, be maintained at a value of 800 or higher for this purpose.

Furthermore, in order to inhibit a wave form distortion in a frequency component, it is required that, as a characteristic of a noise filter for use in an electric circuit, the cross point frequency at an intersection of an R component frequency curve and an X component frequency curve should be controlled at a value of 5 MHz or lower. For this reason, it is required that the initial magnetic permeability of the Ni—Cu—Zn ferrite material, which is for use as a core material of a chip inductor, be maintained at a value of 1200 or higher.

SUMMARY OF THE INVENTION

The present invention can solve the aforementioned problems associated with the conventional art and provides a method of producing a Ni—Cu—Zn ferrite material can be calcined at a temperature of 900 degrees or lower so as to obtain a high density, and has an initial magnetic permeability of 800 or higher or an initial magnetic permeability of 1200 or higher.

The method of producing a Ni—Cu—Zn ferrite material comprises the steps of: preparing a mixture of an iron compound powder having a specific surface area of about 8.5 m$^2$/g or more, a nickel compound powder, copper compound powder and a zinc compound powder, the mixture having a specific surface area of about 8.0 m$^2$/g or more; pre-calcining the mixture such that the pre-calcined mixture has a surface area of about 5.0 m$^2$/g or more and a spinel crystal synthesizability within a range of about 80.5% to 98%; and milling the pre-calcined mixture to obtain a powder of a Ni—Cu—Zn ferrite material having a specific surface area of about 6.0 m$^2$/g or more.

To achieve larger initial magnetic permeability, the nickel compound powder and the zinc compound powder have a specific surface area of about 8.0 m$^2$/g or more, respectively, the mixture has the specific surface area of about 10.0 m$^2$/g or more, the pre-calcining is performed such that the pre-calcined mixture has a surface area of about 6.0 m$^2$/g or more and the spinel crystal synthesizability within a range of about 90% to 95% and the powder of a Ni—Cu—Zn ferrite material has the specific surface area of about 8.0 m$^2$/g or more.

According to the present invention, it is possible to conduct a dense calcining treatment at a temperature of 900° C. or lower, and thus one can obtain Ni—Cu—Zn ferrite material having an initial magnetic permeability of 800 or higher or an initial magnetic permeability of 1200 or higher.

DETAILED DESCRIPTION OF PREFERRED EMBODIMENTS

According to the method of producing a Ni—Cu—Zn ferrite material of the present invention, a mixture of an iron compound, a nickel compound powder, copper compound powder and a zinc compound powder is first prepared. The mixture has a specific surface area of about 8.0 m$^2$/g or more, and the iron compound has a specific surface area of about 8.5 m$^2$/g or more.

The mixture is then pre-calcined. The pre-calcining process is performed such the obtained pre-calcined mixture has a surface area of about 5.0 m$^2$/g or more and a spinel crystal synthesizability of the obtained pre-calcined mixture within a range of about 80.5% to 98%.

Thereafter, the pre-calcined mixture is milled to obtain a powder of a Ni—Cu—Zn ferrite material having a specific surface area of about 6.0 m$^2$/g or more. Note that the spinel crystal synthesizability referred in this specification is defined as a value calculated by the following equation using a peak intensity ($I_{Fe101}$) of (104) surface of $Fe_2O_3$ and a peak intensity ($I_{sp311}$) of (311) surface of the spinel crystal, both of which are measured during X-ray diffraction on the powder material:

Spinel crystal synthesizability (%)=$I_{sp311}/(I_{Fe104}+I_{sp311})\times 100$.

The iron compound used present invention is preferably α $Fe_2O_3$, and more preferably α $Fe_2O_3$ synthesized in a wet method. In addition, the thus obtained Ni—Cu—Zn ferrite material preferably consists of about 48.0 mol % to 49.8 mol % of $Fe_2O_3$, about 20.0 mol % to 34.0 mol % of ZnO, about 6.0 mol % to 20.0 mol % of CuO, with the remainder being NiO.

When the specific surface area of the powder of the Ni—Cu—Zn ferrite material after milling is smaller than about 6.0 $m^2/g$, a reactivity of the powder will be low, thus making it impossible to effect a sufficient calcining treatment at a temperature of 900° C. or lower and the calcining density will be low, making it impossible to obtain an initial magnetic permeability of 800 or higher. For this reason, it is preferred that the specific surface area of the powder material after disintegration is about 6.0 $m^2/g$ or larger.

If the specific surface area of the pre-calcined mixture is smaller than about 5.0 $m^2/g$, the particle of the pre-calcined mixture is undergrown. It may be necessary to extend the milling time or to employ a milling machine of a medium stirring type so to obtain a specific surface area of about 6.0 $m^2/g$ or larger after milling. If so, the amount of impurity coming from a medium such as cobble stones will increase, thus causing a deterioration in the characteristic of the Ni—Cu—Zn ferrite after the calcining treatment. For this reason, it is preferred that the specific surface area of the powder material after pre-calcining is about 5.0 $m^2/g$ or larger.

If spinel crystal synthesizability after pre-calcining treatment is less than 85%, there will be a lot of unreacted $Fe_2O_3$ remaining and thus calcining capability will decrease. Hence, it is impossible to obtain a uniform Ni—Cu—Zn ferrite during the calcining treatment, and thus an initial magnetic permeability of 800 or higher can not be obtained. On the other hand, if the temperature of the pre-calcining is elevated until the spinel crystal synthesizability exceeds 98%, particle growth of the spinel crystal will occur, the specific surface area of the powder material will decrease and hence its reactivity will become low, resulting in a problem that it can not be calcined sufficiently at a temperature of 900° C. or lower. For this reason, it is preferred that the spinel crystal synthesizability after pre-calcining be controlled within a range from about 85% to 98%.

Further, if the specific surface area of the mixture before pre-calcining is smaller than about 8.0 $m^2/g$, the reactivity of the mixture will be low. As a result, if it is desired to obtain a spinel crystal synthesizability of 85% to 98% during the pre-calcining treatment, the mixture will have to be pre-calcined at a temperature higher than that for obtaining a specific surface area of about 8.0 $m^2/g$ or larger. Consequently, the powder particle growth of the powder material will proceed rapidly so that the specific surface area after pre-calcining will become smaller than about 5.0 $m^2/g$. For this reason, it is preferred that the specific surface area of the powder material after compound mixing is at least about 8.0 $m^2/g$.

Even when specific surface area of the powder material of the iron compound is smaller than about 8.5 $m^2/g$, by increasing the specific surface area of powder of nickel compound, zinc compound and copper compound, it is still possible to obtain a specific surface area of about 8.0 $m^2/g$ or larger for the powder material after compound mixing. During the pre-calcining process for treating the Ni—Cu—Zn ferrite material, when there is an increase in temperature, Zn ferrite will at first occur at a low temperature range, and then the Cu and Ni will be solid solved so as to form the Ni—Cu—Zn ferrite. Therefore, when the specific surface area of the iron compound is smaller than about 8.5 $m^2/g$, the temperature for the formation of an initial Zn ferrite will become high. If in the end a spinel crystal synthesizability from about 85% to 98% is to be obtained, the pre-calcining treatment is required to be conducted at a higher temperature than that necessary for treating an iron compound whose specific surface area is about 8.5 $m^2/g$ or larger. As a result, the particle growth of the powder material will become too rapid, resulting in a problem that the specific surface area of the powder material after the pre-calcining is smaller than about 5.0 $m^2/g$. Accordingly, it is preferred that the specific surface area of the iron compound powder material is about 8.5 $m^2/g$ or larger.

In addition, as to the composition of the Ni—Cu—Zn ferrite material, if the amount of $Fe_2O_3$ is less than about 48.0 mol %, saturated magnetization of the ferrite material will become small and its initial magnetic permeability will be lower than 800. On the other hand, if the amount of $Fe_2O_3$ is more than about 49.8 mol %, its friability will become extremely low, and hence it can not be calcined at a temperature of 900° C. or lower. Further, if the amount of CuO is less than about 6.0 mol %, its calcining density can not become high at a temperature of 900° C. or lower. On the other hand, if the amount of CuO is more than about 20.0 mol %, its Curie temperature will become 80° C. or lower. Further, if the amount of ZnO is less than 20.0 mol %, the saturated magnetization produced by a ferri-magnetism will not be sufficient, causing the initial magnetic permeability to become lower than 800. In contrast, when the amount of ZnO is over about 34.0 mol %, its Curie temperature will become 80° C. or lower. For this reason, it is preferred that Ni—Cu—Zn ferrite material has a $Fe_2O_3$ amount from about 48.0 mol % to 49.8 mol %, a ZnO amount from about 20.0 mol % to 34.0 mol %, a CuO amount from about 6.0 mol % to 20.0 mol %, with the balance being NiO.

In addition to the aforementioned conditions, in the case where the Ni—Cu—Zu ferrite material which has an initial magnetic permeability of 1200 or higher is to be produced, it is necessary to employ conditions to obtain more fine powder of the Ni—Cu—Zn ferrite material.

Specifically, it is preferably that the nickel compound powder and the zinc compound powder have a specific surface area of about 8.0 $m^2/g$ or more, respectively, in addition to use of iron compound powder having a specific surface area of about 8.0 $m^2/g$ or more, and the mixture of these compounds has a specific surface area of about 10 $m^2/g$ or more. At least one of the iron compound powder, the nickel compound powder and the zinc compound powder may be synthesized by a wet method.

The pre-calcining process is preferably performed such the obtained pre-calcined mixture has a surface area of about 6.0 $m^2/g$ or more and a spinel crystal synthesizability of the obtained pre-calcined mixture is within a range of about 90% to 95%.

Further, the pre-calcined mixture is preferably milled to obtain a powder of a Ni—Cu—Zn ferrite material having a specific surface area of about 8.0 $m^2/g$ or more.

EXAMPLE 1

At first, α-$Fe_2O_3$ powder materials obtained by a wet synthesizing method were prepared at the various specific surface areas shown in Table 1. Further, there were prepared NiO powder material serving as a nickel compound, CuO powder material serving as a copper compound and ZnO powder material serving as a zinc compound. Subsequently, these powders were combined so that the weights were such that the $Fe_2O_3$ is 48.7 mol %, ZnO is 26.9 mol %, CuO is 10.5 mol % with the balance being NiO. The compounds were then wet mixed in a ball mill, followed by drying.

Next, the powder materials obtained after mixing were pre-calcined at various temperatures shown in Table 1. Subsequently, the powder materials were wet milled in the ball mill. Then, a binder was added in the powder materials thus obtained, and dried, granulated and further treated by pressing, thereby obtaining toroidal members each having a diameter of 20 mm, an inner diameter of 10 mm and a height of 2 mm. After calcining at a temperature of 870° C. for 2 hours, ferrite ceramics were thus obtained.

During the above process, the specific surface area of the powder material after mixing, the powder material after pre-calcining and the powder material after disintegrating were measured by the BET method. Further, an X-ray diffraction analysis was conducted on the powder material after pre-calcining, and a spinel crystal synthesizability was calculated. The above results are shown in Table 1.

For the ferrite ceramic thus obtained, the density was calculated by using Archimedes method, thereby obtaining a relative density (indicated by %) with respect to a theoretical density. Further, initial magnetic permeability was measured with the use of an impedance analyzer. The results are indicated in Table 1. In Table 1, samples labeled with marks * are used to represent those outside of the ranges of the present invention, while the other samples are within the ranges of the present invention.

specific surface area of the powder material after disintegration is set to be about 6.0 $m^2/g$ or larger, and spinel crystal synthesizability after pre-calcining is set to be about 85% to 98%, a Ni—Cu—Zn ferrite material made by using such manufacturing method will exhibit a relative calcining density of 95% or higher when calcined at a temperature of 870° C. Further, the initial magnetic permeability of the ferrite ceramic is 800 or higher, which is necessary for inhibiting a cross point frequency of the chip inductor at 10 MHz or lower.

In contrast to this, as shown in sample numbers 1 and 2, when $\alpha\text{-}Fe_2O_3$ serving as an iron compound has a specific surface area which is smaller than 8.5 $m^2/g$, initial magnetic permeability will be lower than 800 and is this undesirable.

When $\alpha\text{-}Fe_2O_3$ serving as an iron compound has a specific surface area which is smaller than 8.5 $m^2/g$ as shown by sample number 9, even if its pre-calcining temperature is as low as 500° C. and the specific surface area of the powder material after pre-calcining is set to be 5.0 $m^2/g$ or larger, the spinel crystal synthesizability after pre-calcining will still be as low as 70%, resulting in an insufficient pre-calcining treatment. As a result, its relative calcining density is low and its initial magnetic permeability is also low, therefore it is not desirable. On the other hand, as shown by sample numbers 10 to 13, if the pre-calcining temperature is set to be 700° C. or higher, although the spinel crystal synthesizability after pre-calcining will become as high as 85% to 98%, the specific surface area of the powder material after pre-calcining will be smaller than 5.0 $m^2/g$, and the specific surface area of the powder material after disintegration will be smaller than 6.0 $m^3/g$, resulting in a low relative calcining density and a low initial magnetic permeability and which is not desirable.

Further, as shown by sample number 17, even when the specific surface area of the powder material after pre-

TABLE 1

| Sample No. | Specific Surface Area of $\alpha\text{-}Fe_2O_3$ ($m^2/g$) | Pre-calcining Temperature (° C.) | Specific Surface Area ($m^2/g$) After Mixing | After Pre-calcining | After Milling | Spinel crystal synthesizability (%) | Relative Calcining Density (%) | Initial Magnetic Permeability |
|---|---|---|---|---|---|---|---|---|
| *1 | 5.50 | 700 | 5.2 | 4.2 | 4.6 | 83 | 82 | 350 |
| *2 | 7.30 | 700 | 7.1 | 4.5 | 4.9 | 85 | 93 | 750 |
| 3 | 9.21 | 700 | 9.0 | 5.3 | 6.3 | 88 | 97 | 833 |
| 4 | 10.97 | 700 | 10.1 | 5.5 | 6.9 | 89 | 96 | 815 |
| 5 | 13.55 | 700 | 12.8 | 5.7 | 7.5 | 92 | 98 | 920 |
| 6 | 16.21 | 700 | 15.3 | 6.0 | 7.8 | 93 | 98 | 935 |
| 7 | 18.20 | 700 | 16.2 | 6.3 | 8.2 | 95 | 97 | 940 |
| 8 | 22.50 | 700 | 20.5 | 7.2 | 9.2 | 98 | 98 | 960 |
| *9 | 6.0 | 500 | 5.5 | 5.1 | 5.4 | 70 | 67 | 90 |
| *10 | 6.0 | 700 | 5.5 | 3.9 | 4.1 | 88 | 88 | 450 |
| *11 | 6.0 | 750 | 5.5 | 3.7 | 3.8 | 95 | 78 | 370 |
| *12 | 6.0 | 800 | 5.5 | 3.4 | 3.5 | 97 | 72 | 240 |
| *13 | 6.0 | 850 | 5.5 | 3.0 | 3.1 | 98 | 68 | 130 |
| 14 | 13.55 | 600 | 12.5 | 6.9 | 8.7 | 85 | 96 | 850 |
| 15 | 13.55 | 700 | 12.5 | 5.1 | 6.9 | 97 | 95 | 830 |
| 16 | 13.55 | 750 | 12.5 | 5.7 | 7.5 | 92 | 98 | 920 |
| *17 | 13.55 | 550 | 12.5 | 8.8 | 10.6 | 74 | 82 | 620 |
| *18 | 13.55 | 800 | 12.5 | 4.2 | 5.3 | 100 | 87 | 670 |
| *19 | 13.55 | 850 | 12.5 | 3.9 | 4.5 | 100 | 77 | 320 |

It is understood from sample numbers 3 to 8 and 14 to 16 shown in Table 1, that if the method of the present invention uses $\alpha\text{-}Fe_2O_3$ as an iron compound having a specific surface area of about 8.5 $m^2/g$ or larger, the specific surface area of the powder material after mixing is set to be about 8.0 $m^2/g$ or larger, the specific surface area of the powder material after pre-calcining is set to be about 5.0 $m^2/g$ or larger, the calcining is 5.0 $m^2/g$ or larger and the specific surface area of the powder material after disintegration is 6.0 $m^2/g$ or larger, if the spinel crystal synthesizability after pre-calcining is low and out of a range of 85% to 98%, its relative calcining density will become low and its initial magnetic permeability will also become low which is not desirable. On the other hand, as shown by sample numbers 18 and 19, even when the spinel crystal synthesizability after pre-calcining is high, if the specific surface area of the powder material after pre-calcining is smaller than 5.0 m²/g and the specific surface area of the powder material after disintegration is smaller than 6.0 m²/g, its relative calcining density will become low and its initial magnetic permeability will also become low and this is not desirable.

Although in the above embodiment α-Fe₂O₃ obtained in a wet synthesizing method was used as an iron compound, the present invention is not be limited by this. It is also possible to use as an iron compound α-Fe₂O₃ obtained in a method other than the wet synthesizing method, and also to use an iron compound such as Fe₃O₄, FeOOH or the like.

diffraction analysis was conducted on the powder material after pre-calcining, and a spinel crystal synthesizability was calculated. The above results are shown in Table 2.

The density of the ferrite ceramic thus obtained was calculated by using Archimedes method, thereby obtaining a relative density (indicated by %) with respect to a theoretical density. Further, the initial magnetic permeability was measured with the use of an impedance analyzer. The above results are indicated in Table 2. In Table 2, marks * are used to represent those samples outside of the ranges of the present invention, while the other samples are all within the ranges of the present invention.

TABLE 2

| Sample No. | Specific Surface Areas of Various Compounds (m²/g) | | | Pre-calcining Temperature (° C.) | Specific Surface Area (m²/g) | | | Spinel Synthesizability (%) | Relative Calcining Density (%) | Initial Magnetic Permeability |
|---|---|---|---|---|---|---|---|---|---|---|
| | Fe₂O₃ | ZnO | NiO | | After Mixing | After Pre-calcining | After Milling | | | |
| 1 | 12.0 | 45.3 | 9.0 | 600 | 20.5 | 7.5 | 9.8 | 92 | 98 | 1250 |
| 2 | 12.0 | 45.3 | 9.0 | 700 | 20.5 | 6.7 | 8.5 | 95 | 98 | 1280 |
| *3 | 12.0 | 4.1 | 4.1 | 500 | 12.5 | 8.8 | 10.6 | 74 | 82 | 620 |
| *4 | 12.0 | 4.1 | 4.1 | 700 | 12.5 | 6.9 | 8.7 | 85 | 96 | 850 |
| *5 | 12.0 | 4.1 | 4.1 | 750 | 12.5 | 5.7 | 7.5 | 92 | 98 | 970 |
| *6 | 12.0 | 4.1 | 4.1 | 800 | 12.5 | 5.1 | 6.9 | 97 | 95 | 830 |
| *7 | 12.0 | 4.1 | 4.1 | 850 | 12.5 | 4.2 | 5.3 | 100 | 87 | 670 |
| *8 | 6.2 | 4.1 | 4.1 | 500 | 5.5 | 5.1 | 5.4 | 70 | 67 | 90 |
| *9 | 6.2 | 4.1 | 4.1 | 700 | 5.5 | 3.9 | 4.1 | 88 | 88 | 450 |
| *10 | 6.2 | 4.1 | 4.1 | 750 | 5.5 | 3.7 | 3.8 | 95 | 78 | 370 |
| *11 | 6.2 | 4.1 | 4.1 | 800 | 5.5 | 3.4 | 3.5 | 97 | 72 | 240 |
| *12 | 6.2 | 4.1 | 4.1 | 850 | 5.5 | 3.0 | 3.1 | 98 | 68 | 130 |
| *13 | 12.0 | 45.3 | 9.0 | 550 | 20.5 | 10.5 | 12.7 | 88 | 95 | 860 |
| *14 | 12.0 | 45.3 | 9.0 | 750 | 20.5 | 5.5 | 7.2 | 100 | 92 | 1120 |
| *15 | 12.0 | 45.3 | 9.0 | 800 | 20.5 | 4.5 | 6.0 | 100 | 88 | 970 |

EXAMPLE 2

At first, an α-Fe₂O₃ powder material having a specific surface area of 12.0 m²/g or 6.2 m²/g was prepared as an iron compound, a ZnO powder material having a specific surface area of 45.3 m²/g or 4.1 m²/g was prepared as a zinc compound, and a NiO powder material having a specific surface area of 9.0 m²/g or 4.1 m²/g was prepared as a nickel compound. Further, a CuO powder material was prepared as a copper compound. Thereafter, the specific surface areas of the powder materials were selected as shown in Table 2 and these compounds were combined in weights so that Fe₂O₃ is 48.7 mol %, ZnO is 26.9 mol %, CuO is 10.5 mol %, with the balance being NiO. The compounds were then wet mixed in a ball mill, followed by drying.

Next, powder materials obtained after mixing were pre-calcined at various temperatures shown in Table 2. Subsequently, the powder materials were wet milled in the ball mill. Then, a binder was added in the powder materials thus obtained, and dried, granulated and further treated by pressing, thereby obtaining toroidal members each having a diameter of 20 mm, an inner diameter of 10 mm and a height of 2 mm. After calcining at a temperature of 870° C. for 2 hours, ferrite ceramics were thus obtained.

During the above process, the specific surface areas of the powder material after mixing, powder material after pre-calcining and powder material after disintegrating were measured by the use of BET method. Further, an X-ray As is understood from sample numbers 1, 2 shown in Table 2, when the method of the present invention uses, as an iron compound, an α-Fe₂O₃ powder material having a specific surface area of 8.5 m²/g or larger, and uses, as said nickel compound and said zinc compound, powder materials each having a specific surface area of 8.0 m²/g or larger, and when the specific surface area of the powder material after mixing is set to be 10.0 m²/g or larger, the specific surface area of the powder material after pre-calcining is set to be 6.0 m²/g or larger, the specific surface area of the powder material after disintegration is set to be 8.0 m²/g or larger, the spinel crystal synthesizability after pre-calcining is set to be 90% to 95%, a Ni—Cu—Zn ferrite material made by using such manufacturing method will exhibit a relative calcining density of 98% or higher when calcined at a temperature of 870° C. Further, the initial magnetic permeability of the ferrite ceramic 1200 or higher which is necessary for inhibiting a cross point frequency of the chip inductor at 5 MHz or lower.

In contrast to this, as shown by sample numbers 3, 4, when an α-Fe₂O₃ powder material for use as an iron compound has a specific surface area of 8.5 m²/g or larger, and when each of a ZnO powder material for use as a zinc compound and a NiO powder material for use as a nickel compound have a specific surface area smaller than 8.0 m²/g, if the pre-calcining temperature is set to be 700 C or lower, it is possible that the specific surface area of the powder material after pre-calcining may be made to be 6.0 m²/g or larger and further that the specific surface area of the powder material after disintegration may be made to be 8.0 m$^2$/g or larger, but the spinel crystal synthesizability will be lower than 90% and it is impossible to obtain an initial magnetic permeability of 1200 or higher, which is not desirable.

When the specific surface area of ZnO powder material and the specific surface area of NiO powder material are smaller than 8.0 m$^2$/g, as shown by sample numbers 5 to 7, if the pre-calcining temperature is made to be 750° C. or higher, it is possible to increase the spinel crystal synthesizability, but it is impossible to obtain an initial magnetic permeability of 1200 or higher, which is not desirable.

As shown by sample numbers from 8 to 12, when the specific surface area of $\alpha$-Fe$_2$O$_3$ powder is less than 8.5 m$^2$/g and when the specific surface area of ZnO powder material and the specific surface area of NiO powder material are all smaller than 8.0 m$^2$/g, even if the pre-calcining temperature is elevated or lowered, it is still impossible to obtain a pre-calcined powder material having a specific surface area of 6.0 m$^2$/g or larger. Moreover, if the pre-calcining temperature is elevated, although it is possible to increase the spinel crystal synthesizability, the reactivity of the powder material will become low. For this reason, it is impossible to increase the relative calcining density and thus it is impossible to obtain an initial magnetic permeability of 1200 or higher, which is not desirable.

In addition, as shown by sample number 13, even when the specific surface area of the powder material after pre-calcining is 6.0 m$^2$/g or larger and the specific surface area of the powder material after disintegration is 8.0 m$^2$/g or larger, if the spinel crystal synthesizability after pre-calcining is out of a range extending from 90% to 95% and is low, it is impossible to obtain an initial magnetic permeability of 1200 or higher, which is not desirable. Moreover, as shown by sample numbers 14 and 15, even when the specific surface area of the powder material after pre-calcining is 6.0 m$^2$/g or larger and the specific surface area of the powder material after disintegration is 8.0 m$^2$/g or larger, if the spinel crystal synthesizability after pre-calcining is undesirably high, such as 95%, it is impossible to increase the relative calcining density and it is also impossible to obtain an initial magnetic permeability of 1200 or higher.

It is preferred that the $\alpha$-Fe$_2$O$_3$, ZnO and NiO powder materials are those synthesized in a wet method involving the use of a simplified disintegrating process for producing fine powder particles. Such powder materials are effective in preventing characteristic deterioration due to an invasion of an impurity.

The iron compound is not limited to $\alpha$-Fe$_2$O$_3$ powder material. It is possible to use other iron compounds such as Fe$_3$O$_4$ and FeOOH. The nickel compound is not limited to NiO as it is permitted to use other nickel compounds such as Ni$_2$O$_3$.

Furthermore, the copper oxide raw material for use as a copper compound is preferred to have a specific surface area of about 4.0 m$^2$/g or larger, since it is useful for obtaining a uniform reactivity and thus more preferable.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method of producing a Ni—Cu—Zn ferrite material comprising the steps of:

providing a mixture of an iron compound powder having a specific surface area of about 8.5 m$^2$/g or more, nickel compound powder, copper compound powder and a zinc compound powder, the mixture having a specific surface area of about 8.0 m$^2$/g or more;

pre-calcining the mixture such that the pre-calcined mixture has a surface area of about 5.0 m$^2$/g or more and a spinel crystal synthesizability within a range of about 80.5% to 98%; and milling the pre-calcined mixture to obtain a Ni—Cu—Zn ferrite material powder having a specific surface area about of 6.0 m$^2$/g or more.

2. A method of producing a Ni—Cu—Zn ferrite material according to claim 1, wherein the iron compound is $\alpha$-Fe$_2$O$_3$.

3. A method of producing a Ni—Cu—Zn ferrite material according to claim 2, wherein the iron compound is wet method synthesized $\alpha$-Fe$_2$O$_3$.

4. A method of manufacturing Ni—Cu—Zn ferrite material according to claim 3, wherein the Ni—Cu—Zn ferrite material comprises about 48.0 mol % to 49.8 mol % of Fe$_2$O$_3$, 20.0 mol % to 34.0 mol % of ZnO, 6.0 mol % to 20.0 mol % of CuO, with the balance being NiO.

5. A method of manufacturing Ni—Cu—Zn ferrite material according to claim 1, wherein the Ni—Cu—Zn ferrite material comprises about 48.0 mol % to 49.8 mol % of Fe$_2$O$_3$, about 20.0 mol % to 34.0 mol % of ZnO, about 6.0 mol % to 20.0 mol % of CuO, with the balance being NiO.

6. A method of manufacturing Ni—Cu—Zn ferrite material according to claim 1, wherein the nickel compound powder and the zinc compound powder have a specific surface area of about 8.0 m$^2$/g or more, respectively, and the mixture has the specific surface area of about 10.0 m$^2$/g or more.

7. A method of manufacturing Ni—Cu—Zn ferrite material according to claim 6, wherein the pre-calcining is performed such that the pre-calcined mixture has a surface area of about 6.0 m$^2$/g or more and the spinel crystal synthesizability within a range of about 90% to 95%.

8. A method of manufacturing Ni—Cu—Zn ferrite material according to claim 7, wherein the milled powder of a Ni—Cu—Zn ferrite material has the specific surface area of about 8.0 m$^2$/g or more.

9. A method of producing a Ni—Cu—Zn ferrite material according to claim 8, wherein at least one of the iron compound powder, nickel compound powder and zinc compound powder is wet method synthesized powder.

10. A method of manufacturing Ni—Cu—Zn ferrite material according to claim 9, wherein the Ni—Cu—Zn ferrite material comprises about 48.0 mol % to 49.8 mol % of Fe$_2$O$_3$, about 20.0 mol % to 34.0 mol % of ZnO, about 6.0 mol % to 20.0 mol % of CuO, with the balance being NiO.

11. A method of producing a Ni—Cu—Zn ferrite material according to claim 10, wherein the iron compound is wet method synthesized $\alpha$-Fe$_2$O$_3$.

12. A method of producing a Ni—Cu—Zn ferrite material according to claim 11, wherein the CuO powder has a specific surface area of at least 4 m$^2$/g.

13. A method of producing a Ni—Cu—Zn ferrite material according to claim 1, wherein the CuO powder has a specific surface area of at least 4 m$^2$/g.

14. A method of producing a Ni—Cu—Zn ferrite material according to claim 5, wherein at least one of the iron compound powder, nickel compound powder and zinc compound powder is wet method synthesized powder.

15. A method of producing a Ni—Cu—Zn ferrite material according to claim 2, wherein at least one of the iron compound powder, nickel compound powder and zinc compound powder is wet method synthesized powder.

16. A method of producing a Ni—Cu—Zn ferrite material according to claim 1, wherein at least one of the iron compound powder, nickel compound powder and zinc compound powder is wet method synthesized powder.

17. A method of producing a Ni—Cu—Zn ferrite material according to claim 1, comprising the step of preparing a mixture of an iron compound powder having a specific surface area of about 8.5 $M^2/g$ or more, nickel compound powder, copper compound powder and a zinc compound powder, the mixture having a specific surface area of about 8.0 $M^2/g$ or more.

18. A method of producing a Ni—Cu—Zn ferrite material according to claim 17, wherein at least one of the iron compound powder, nickel compound powder and zinc compound powder is wet method synthesized powder.

19. A method of producing a Ni—Cu—Zn ferrite material according to claim 18, wherein the iron compound is $\alpha\text{-Fe}_2\text{O}_3$.

20. A method of producing a Ni—Cu—Zn ferrite material according to claim 19, wherein the iron compound is wet method synthesized $\alpha\text{-Fe}_2\text{O}_3$.

* * * * *

UNITED STATES PATENT AND TRADEMARK OFFICE
CERTIFICATE OF CORRECTION

PATENT NO. : 6,187,218
DATED : February 13, 2001
INVENTOR(S) : Takashi KODAMA et al.

Page 1 of 1

It is certified that error appears in the above-identified patent and that said Letters Patent is hereby corrected as shown below:

In the patent headings under item "(30) Foreign Application priority data", for "Oct. 19, 1908", read --October 1, 1998--.

Signed and Sealed this

Fifth Day of June, 2001

*Attest:*

NICHOLAS P. GODICI

*Attesting Officer*

*Acting Director of the United States Patent and Trademark Office*